US012748643B1

(12) United States Patent
Wang et al.

(10) Patent No.: US 12,748,643 B1
(45) Date of Patent: Sep. 29, 2026

(54) API GENERATOR FOR NETWORK-MODEL DATABASE

(71) Applicant: Science Applications International Corporation, Reston, VA (US)

(72) Inventors: Jian Wang, Sterling, VA (US); Mengzhu Wang, Vancouver, WA (US); Kristaps T. Dzonsons, Portland, OR (US)

(73) Assignee: Science Applications International Corporation, Reston, VA (US)

( * ) Notice: Subject to any disclaimer, the term of this patent is extended or adjusted under 35 U.S.C. 154(b) by 349 days.

(21) Appl. No.: 18/228,872

(22) Filed: Aug. 1, 2023

(51) Int. Cl.
*G06F 9/44* (2018.01)
*G06F 9/54* (2006.01)

(52) U.S. Cl.
CPC .................................... *G06F 9/547* (2013.01)

(58) Field of Classification Search
CPC ....................................................... G06F 9/547
USPC ......................................................... 719/328
See application file for complete search history.

(56) References Cited

U.S. PATENT DOCUMENTS

2004/0148612 A1* 7/2004 Olsen .................... G06F 40/143 707/E17.124
2017/0078360 A1* 3/2017 Kumar ...................... G06F 9/00

OTHER PUBLICATIONS

ClearPath Enterprise Servers Network Database Server Resource Adapter for the Java™ Platform User Guide, Downloaded May 17, 2023 from <<https://public.support.unisys.com/2200/docs/jprocessor-3.0/pdf/38508362-004.pdf>>, 202 pages.

* cited by examiner

*Primary Examiner* — Timothy A Mudrick
(74) *Attorney, Agent, or Firm* — Banner & Witcoff, Ltd.

(57) ABSTRACT

An API generator may generate an API for performing actions on a database. The database may comprise a network-model database configured for access by one or more COBOL-based applications, and the generated API may be JAVA-based. The API generator may generate the API without requiring a user to write code and without requiring that user to have a detailed knowledge of data structures used by the network-model database.

23 Claims, 8 Drawing Sheets

API GENERATOR FOR NETWORK-MODEL DATABASE

BACKGROUND

Many early computer databases were based on a network model, which is also known as a CodaSyl model (named after an organization that took its name from a 1959 Conference on Data Systems Languages). A database based on a network model (network-model database) has a data structure that is quite different from that of relational databases. A network-model database is based on "sets." A set comprises records, and in particular, a parent (or "owner") record and one or more child (or "member") records. Any given record may be part of multiple sets (e.g., a child of multiple parent records and/or a parent record of multiple different sets), typically resulting in a network of interrelated records. Records (parent and child) hold data items that represent the actual data being stored in the network-model database. Network-model databases were designed for access by applications written in the Common Business Oriented Language (COBOL) programming language.

Network-model databases and COBOL-based database applications have become less popular and less pervasive as newer database models (e.g., a relational model used by relational databases), designed for access by applications written in more modern programming languages (e.g., JAVA), are increasingly adopted. However, many legacy network-model databases and COBOL-based database applications remain in use. But as fewer developers learn to program in COBOL and to work with network-model databases, finding developers to maintain legacy network-model databases and COBOL-based database applications becomes increasingly difficult. Some existing products provide a JAVA-based interface to network-model databases. But such existing products may require a developer to write JAVA code for an application programming interface (API) that another application may use to access the network-model database. And to create such an API, a developer may need a detailed knowledge of a particular network-model database and of specific data structures used to store data items in that database. Such detailed knowledge may not be available and/or may be difficult to obtain, and requiring all developers to have that knowledge may be inefficient and/or economically impractical.

SUMMARY

This Summary is provided to introduce a selection of some concepts in a simplified form as a prelude to the Detailed Description. This Summary is not intended to identify key or essential features.

An API generator may be configured to receive data indicating selection of one or more record types of a network-model database. The network-model database may be a database configured for access by one or more COBOL applications. The API generator may be further configured to receive data that indicates selection of one or more actions to be performed for one or more records, of the one or more selected record types, stored by the network-model database. Based on the selected record type(s) and the selected action (s), and based on configuration data, the API generator may generate a JAVA-based API for performing the selected action(s). The configuration data may include data that is based on the one or more COBOL applications and that indicates data structures for storing data items of the one or more records for which the selected action(s) may be performed. The generated API may be output and may, for example, be incorporated into other applications for use in accessing data in the network-model database. The API generator may generate the API without requiring a user to write code and without requiring that user to have a detailed knowledge of data structures used by the network-model database.

These and other features are described in more detail below.

BRIEF DESCRIPTION OF THE DRAWINGS

Some features are shown by way of example, and not by way of limitation, in the figures of the accompanying drawings and in which like reference numerals refer to similar elements.

DETAILED DESCRIPTION

An application programming interface (API) generator, such as API generators described herein, may comprise one or more software programs that are configured to generate, based data indicating selections by a user, an API that may be used to access a network-model (e.g., CodaSyl) database. The generated API may be based on (e.g., comprise source code written in) JAVA, in another object-oriented programming language, or in another programming language other than COBOL. A user of the API generator need not write code for the API and need not have a detailed knowledge of data structures used in the network-model database.

Figure 1:
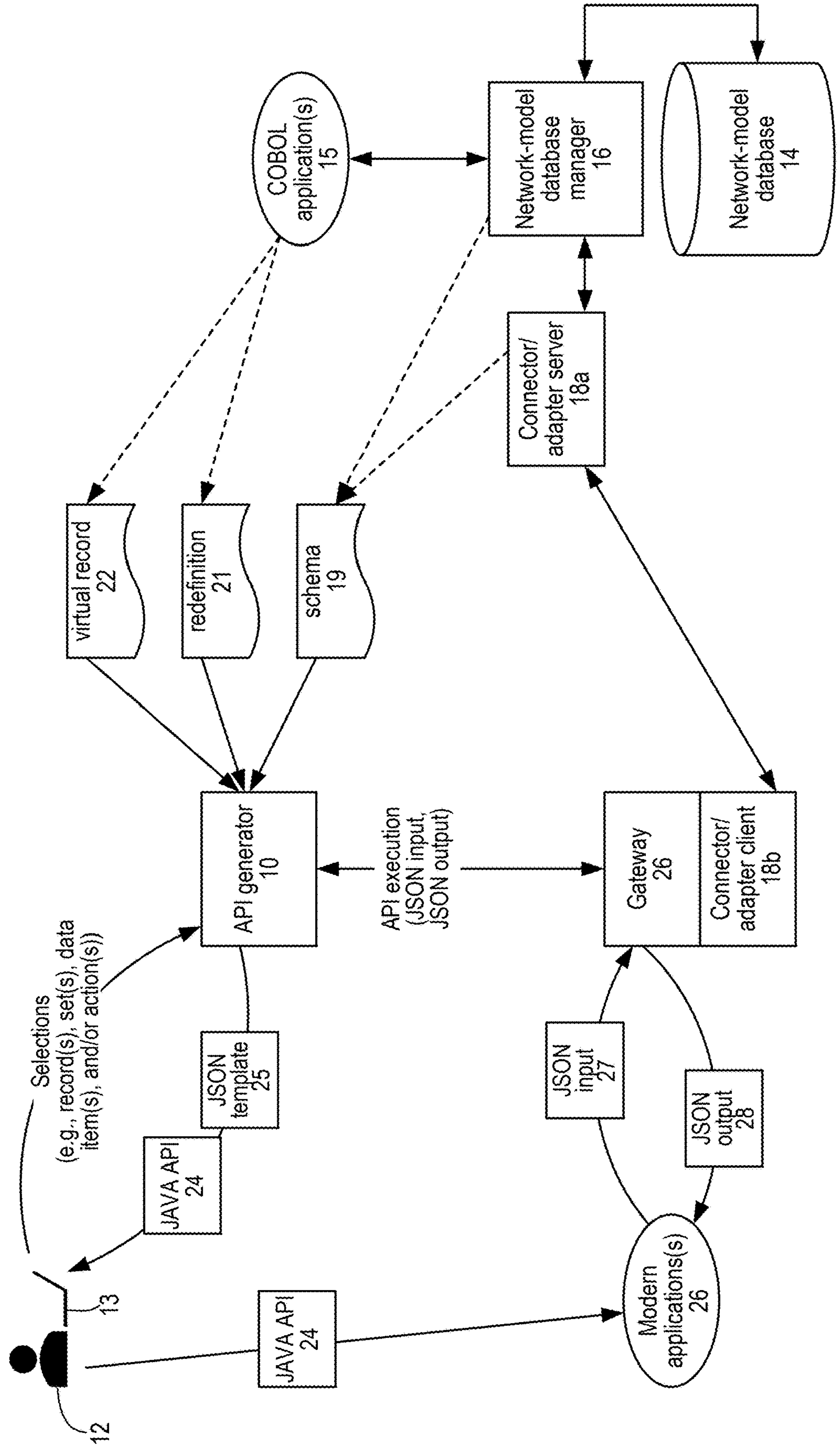
FIG. 1 is a block diagram showing an example software architecture that comprises an API generator and a corresponding network-model database.

FIG. 1 is a block diagram showing an example architecture for a software environment that comprises an API generator 10. The API generator 10 may comprise one or more software programs that are configured to be executed by one or more computing devices and to generate, based on selections by a user 12 via a computing device 13, APIs that may be used to access a network-model database 14.

The network-model database 14 may be configured for access by one or more software applications 15 that are based on (e.g., written in) COmmon Business Oriented Language (COBOL). For example, the database 14 may have been initially designed, and/or modified over time, to use data structures that are commonly used by COBOL-based applications, but which may not be recognized or easily handled by applications written in JAVA or other more modern programming languages. Examples of such data structures are provided below.

The COBOL applications 15 may read, write to, or otherwise modify the database 14 to carry out one or more functions that use and/or generate data stored in the database 14. The COBOL applications 15 may be legacy software applications for which updating or modification may be difficult and/or for which there may be few available developers.

The COBOL applications 15 may access the database 14 via a network-model database manager 16. The database manager 16 may comprise one or more software programs configured to recognize COBOL-based instructions and to manage and control access to the database 14 by COBOL applications, such as the applications 15, that may seek to read, write to, or otherwise modify data in the database 14. The database manager 16 may, for example, control which records may be accessed, control which applications and/or users may access records, may lock records (e.g., prevent a second application or user from modifying a record being accessed by a first application or user), and/or perform other operations. Examples of systems such as the database manager 16 may comprise a Unisys OS 2200 database manager and/or other network-model database management system.

The example architecture may also comprise a connector/adapter server 18*a* and a connector/adapter client 18*b* (collectively, the connector/adapter 18). The connector/adapter server 18*a* and client 18*b* may allow JAVA-based applications to access the database 14. The server 18*a*, for example, may be configured to translate requests from the client 18*b* into instructions, recognizable by the database manager 16, to perform read, write, and/or other operations on data in the database 14. The client 18*b* may be configured to allow a developer to interface with the database 14 using JAVA-based software that may be created using a software development kit (SDK). The client 18*b* may, for example, be distributed as JAVA bytecode and comprise an abstract representation of the database 14 and/or query and/or modification facilities. The abstract representation of the database 14 may comprise a schema file 19 that describes record types and relationships between those record types in the database 14, and that may also describe access methods associated with each record type. Access methods are described in further detail below. The schema file 19 may be in extensible markup language (XML) format and may be generated (e.g., by the server 18*b*) based on one or more CodaSyl-based data definition language (DDL) files for the database 14 that may be stored by and/or accessed via the database manager 16. However, the schema file 19 may lack database key information (e.g., partition and/or other physical address information for stored data items), as such information may not be included when generating an XML file. The schema file 19 may also lack information regarding certain records of the database 14 (e.g., records that may be stored using unnamed data fields, in binary data blocks, and/or using data overlay, as described in more detail below). An example of a connector/adapter such as the connector/adapter 18 is the Database Management System Resource Adapter of the Unisys OS 2200 Database Management System.

Although known connector/adapters may allow JAVA-based applications to access a network-model database, they may still require a developer to write a substantial amount of code. Moreover, a user of known connector/adapters may be required have a detailed understanding of how the network-model database is structured. For example, simply knowing the schema for the network-model database and may not be sufficient. In order to access some data in a network-model database, a user of known connector/adapters may need to know of certain data structures that are commonly used in network-model databases and that may be configured for access by COBOL-based applications, but that may not be common to (or even recognized by) modern programming languages like JAVA.

The API generator 10 may supplement, and overcome limitations associated with, the connector/adapter 18. Instead of requiring the user 12 to write JAVA code for accessing the database 14 via the client 18*b*, the API generator 10 may generate code based on selections (e.g., via drop-down menus and/or other user interface) of record types, sets, data items/fields, actions to be performed on records, etc. APIs generated for the user 12 by the API generator 10 may also allow access to data in the database 14 that may be stored using data structures that may not be recognized by JAVA-based programs and/or may allow access to records of the database 14 that are not described in a schema file generated and/or used by the connector/adapter 18, but without requiring the user 12 to have the detailed knowledge of those data structures that might otherwise be necessary to access that data using the connector/adapter 18.

To generate an API for accessing the database 14, the API generator 10 may use data in one or more configuration files. Those configuration files may comprise the schema file 19, a schema redefinition file 21, and a virtual record file 22. The schema redefinition file 21 may be based on instructions from the one or more COBOL applications 15 and may comprise data structure information that may be used to interpret data items stored using certain data structure(s) (e.g., unnamed (or hidden) data fields) in the database 14. The redefinition data may, for example, comprise record types for which some or all record data is stored in unnamed data fields, other data items associated with data items in unnamed data fields (e.g., a data item for which record data may be stored in a named field adjacent to an associated unnamed field), and/or other data for accessing records having record data stored in an unnamed field. Storage of record data in unnamed data fields, and redefinition data for accessing such record data, is further described below in connection with FIG. 3. The virtual record file 22 may also be based on instructions from the one or more COBOL applications 15 and may comprise virtual record data that indicates records for which some or all record data is stored in binary data blocks in the database 14 and/or stored in the database 14 using data overlay. The virtual record data may, for example, comprise record types for which some or all record data is stored in binary data blocks and/or using data overlay, relationships of those record types to other record types, and/or other data for accessing records having record data stored in binary data blocks and/or using data overlay. Storage of record data in binary data blocks, and virtual record data for accessing such record data, is further described below in connection with FIGS. 4 and 5. Storage of record data using data overlay, and virtual record data for accessing such record data, is further described below in connection with FIGS. 6 and 7.

The API generator 10 may, based on the schema file 19, the redefinition file 21, and the virtual record file 22, determine record types and set types for the database 14. Based on the determined record types and set types, the API generator 10 may provide one or more user interfaces via which the user 12 may provide (via the computing device 13) input to select record types to access, to select other record types to access in a set type associated with an already-selected record type, and/or to select specific types of record data to access in a selected record type. The user interfaces may comprise drop-down lists, graphical displays of the schema for the database 14 with hyperlinks associated with record and/or set types, and/or other types of user interfaces. The API generator 10 may also provide one or more user interfaces via which the user 12 may select one or more actions associated with access to selected record types and/or record data. The one or more actions may comprise viewing/reading records (or portions thereof) and/or modifying records (or portions thereof). Modifying may comprise writing data to a record, deleting data from a record, deleting a record, and/or adding a record.

Based on the selections by the user 12, and based on schema data in the schema file 19, redefinition data in the schema redefinition file 21, and virtual record data in the virtual record file 22 (and/or based on schema data, redefinition data, and virtual record data contained in a single file or distributed among other combinations of files), the API generator 10 may generate an API 24 in JAVA code and a Javascript Object Notation (JSON) template 25. The generated API 24 may be defined as a JAVA class with a public method (e.g., named "execute") that takes an input JSON object as an argument. The input JSON object may specify records to access, data to be written to records, records to add or delete, data to return, and a format of data to be returned. The JSON template 25 may be a template for a JSON object that the API 24 receives as an input. The API 24 may be integrated into other applications 26, which may comprise applications written in JAVA and/or other modern programming languages. Also, or alternatively, the API 24 may be integrated into and/or executed by commercially available API software such as WebMethods (available from Software AG) or Apigee (available from Google, Inc.). Also, or alternatively, the user 12 may cause the API generator 10 to execute the API 25.

The API 24 may be configured to access the database 14 via the client 18*b*. The API 24 may access the client 18*b* via a gateway 26 that may in turn be accessible via the Internet and/or via another network.

Upon execution of the public method of the API 24, the API 24 may perform actions for records specified in an input JSON object 27. Those actions may comprise writing data specified in the input JSON object 27 to records of the database 14, adding records specified by the input JSON object 27 to the database 14, deleting records specified by the input JSON object 27 from the database 14, reading data from records in the database 14 specified by the input JSON object 27, etc. The API 24 may provide output data (e.g., data read from records, confirmations/indications of data/records modified, added, or deleted) as an output JSON object 28.

Figure 2:
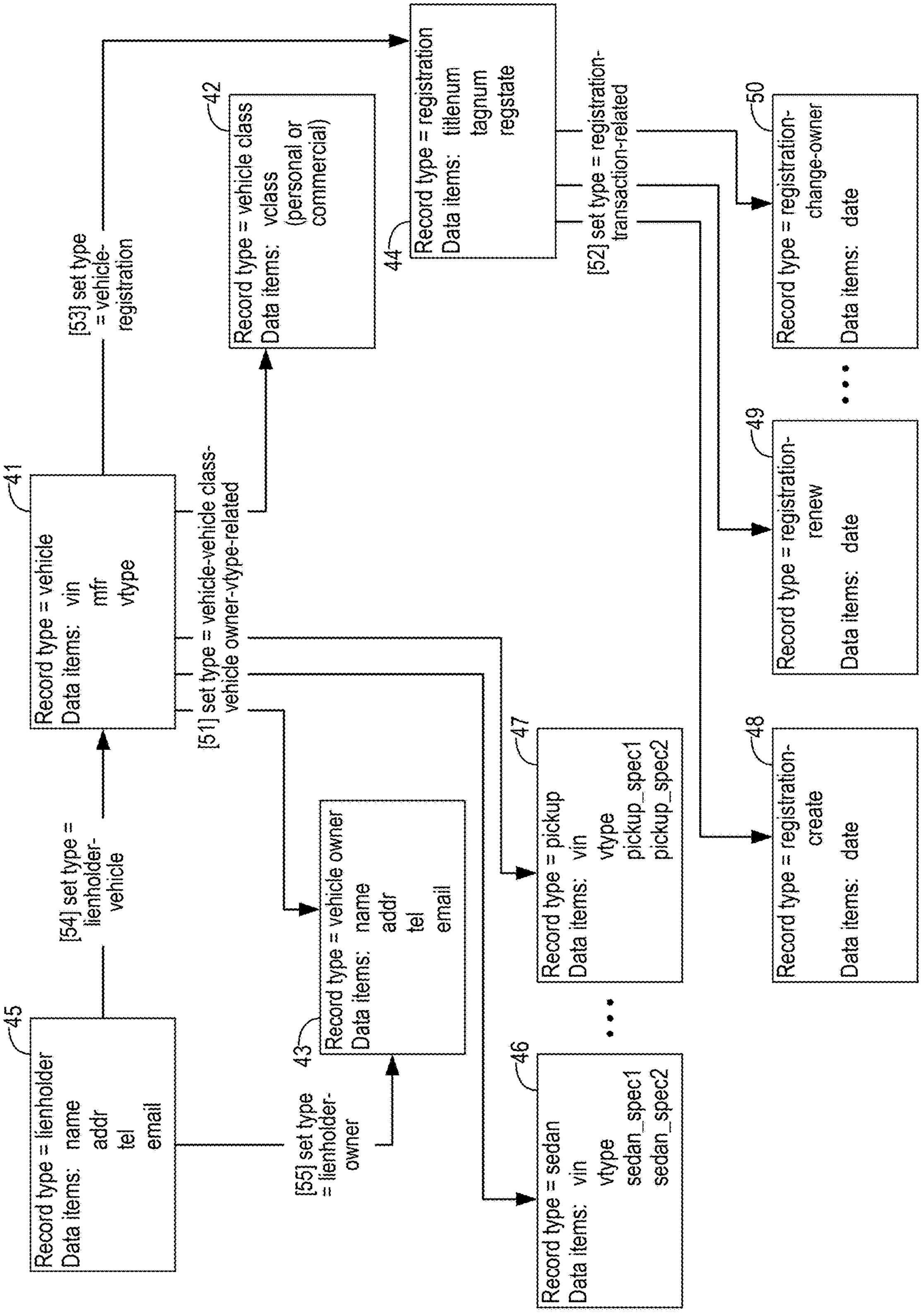
FIG. 2 is a block diagram showing a portion of a schema for an example network-model database.

FIG. 2 is a block diagram showing an example schema for the database 14. The example of FIG. 2 is a simplified schema that will be used herein to describe operation of the API generator 10. An actual schema for an actual network-model database may be substantially more complex. In FIG. 2, boxes indicate record types of the database 14. Set types are indicated by arrows connecting record types, with arrows pointing from parent (or owner) record types to child (or member) record types. A record may be a collection of data items. Data items may be stored in fields of a record. A data item may be a unit of data in a database. A record may be a collection of one or more data items, and a set may be a related collection of records. A record type may be a category of records that share characteristics and/or that hold the same type(s) of data item(s). A set type may be category of related record types. As explained in more detail below, some or all of the records shown in FIG. 2, and/or data (e.g., access methods, storage locations, etc.) associated with those records may not be described by the schema file 19.

The database 14 may hold various types of information for a collection of motor vehicles such as automobiles, motorcycles, trucks, etc. A "vehicle" record type 41 may be a type of record (a "vehicle" record) used to hold data items for a specific vehicle. Those data items may, for example, comprise a 17-character vehicle identification number (vin), a manufacturer name (mfr), a vehicle type (vtype) (e.g., sedan, SUV, minivan, pickup, motorcycle, etc.), and/or other information. The vehicle record type 41 is a parent of the "vehicle class" record type 42, which may be a type of record used to hold a data item (vclass) having a value indicating whether a vehicle is a commercial vehicle (e.g., owned by a corporation) or a personal vehicle (e.g., owned by an individual). In particular, a vehicle class record may be used to hold a data item that indicates, for a vehicle corresponding to the vehicle record that is a parent of the vehicle class record, whether that vehicle is a commercial vehicle or personal vehicle. The vehicle record type 41 is also a parent of the "vehicle owner" record type 43, which may be a type of record (a "vehicle owner" record) used to hold data items for a specific vehicle owner of a specific vehicle. In particular, a vehicle owner record may be used to hold data items for a vehicle owner of a vehicle corresponding to the vehicle record that is the parent of the vehicle owner record. Data items in a vehicle owner record may include a vehicle owner name (name, which may be a name of an individual or a name of a corporation or other entity), a vehicle owner address (addr), a vehicle owner telephone number (tel), a vehicle owner email address (email), and/or other data items.

The vehicle record type 41 is also a parent of multiple record types that each respectively corresponds to a different possible value of vtype. For convenience, those record types (and corresponding records) are referred to a "vtype-related." For example, the vehicle record type 41 is a parent of a "sedan" record type 46, which may be a type of record (a "sedan" record) used to hold data items for a specific vehicle if that vehicle is a sedan: the vehicle identification number (vin) for the vehicle, the vehicle type (vtype) of the vehicle, and two types of data (sedan_spec1 and sedan_spec2) that apply to sedans, but that may not apply to pickup trucks or to other vehicle types. The vehicle record type 41 is also a parent of a "pickup" record type 47, which may be a type of record (a "pickup" record) used to hold data items for a specific vehicle if that vehicle is a pickup: the vehicle identification number (vin) for the vehicle, the vehicle type (vtype) of the vehicle, and two types of data (pickup_spec1 and pickup_spec2) that apply to pickup trucks, but that may not apply to sedans or to other vehicle types. Although only vtype-related record types 46 and 47 are shown in FIG. 2, there may additional vtype-related record types corresponding to other values of vtype. As can be appreciated from the present example, a given vehicle record may not have child records corresponding to each of the vtype-related record types, and may only have one child vtype-related record.

The vehicle record type 41 is additionally a parent of the "registration" record type 44, which may be a type of record (a "registration" record) used to hold data items for a specific vehicle. In particular, a registration record may be used to hold data items for a vehicle corresponding to the vehicle record that is the parent of the registration record. Data items in a registration record may include a title number (titlenum), a license plate/tag number (tagnum), and a state of registration (regstate).

The registration record type 44 is also a parent of multiple record types that each respectively corresponds to a different possible type of registration transaction. For convenience, those record types (and corresponding records) are referred to a "transaction-related." The registration record type 44 is a parent of a "registration-create" record type 48, which may be a type of record (a "registration-create" record) used to hold data indicating a date on which a vehicle was initially registered. The registration record type 44 is also a parent of a "registration-renew" record type 49, which may be a type of record (a "registration-renew" record) used to hold data indicating a date on which a registration for a vehicle was renewed. The registration record type 44 is also a parent of a "registration-change-owner" record type 50, which may be a type of record (a "registration-change-owner" record) used to hold data indicating a date on which a registration for a vehicle was updated because of a change in vehicle ownership. Although only transaction-related record types 48, 49, and 50 are shown in FIG. 2, there may additional transaction-related record types. As can be appreciated from the present example, a given registration record may have child records corresponding to some or all of the transaction-related record types.

A vehicle-vehicle class-vehicle owner-vtype-related set type 51 comprises the vehicle record type 41 (the parent record type), the vehicle class record type 42 (a child record type), the vehicle owner record type 43 (another child record type), and vtype-related record types such as the sedan record type 46 and the pickup record type 47 (additional child record types). A vehicle-vehicle class-vehicle owner-vtype-related set comprises a parent vehicle record (of the vehicle record type 41), a child vehicle class record (of the vehicle class record type 42), a child vehicle owner record (of the vehicle owner record type 43), and a vtype-related record (of one of the vtype-related record types). A vehicle-registration set type 53 comprises the vehicle record type 41 and the registration record type 44, and a vehicle-registration set comprises a parent vehicle record and its child registration record. A vehicle-registration set comprises a parent vehicle record (of the vehicle record type 41) and a child registration record (of the registration record type 44). A registration-transaction-related set type 52 comprises the registration record type 44 (the parent record type) and one or more transaction-related record types such as the registration-create record type 48, the registration-renew record type 49, and the registration-change-owner record type 50 (child record types). A registration-transaction-related set comprises a parent registration record (of the registration record type 44) and one or more transaction-related records (of the transaction-related record types).

The vehicle record type 41 itself has a parent record type. A lienholder record type 45 is a parent of the vehicle record type 41 and is a type of record (a lienholder record) used to hold data items for a lienholder for a specific vehicle. In particular, a lienholder record may be used to hold data items (e.g., a name, address (addr), telephone number (tel), email address (email)) for an entity (e.g., a bank or other lender) that has a lien or other security interest in a vehicle corresponding to the vehicle record that is the child of the lienholder record. The lienholder record type 45 may also be a parent of the vehicle owner record type 43, and a lienholder record may thus be associated with the vehicle owner of the specific vehicle for which the lienholder (indicated by the parent lienholder record) holds a lien. A lienholder-vehicle set type 54 comprises the lienholder record type 45 and the vehicle record type 41, and a lienholder-vehicle set comprises a parent lienholder record and its child vehicle record. A lienholder-vehicle owner set type 55 comprises the lienholder record type 45 and the vehicle owner record type 43, and a lienholder-vehicle owner set comprises a parent lienholder record and its child vehicle owner record.

Although not shown in FIG. 2, a schema may also include an access method for record types of the schema. Access methods may comprise "index," which may correspond to accessing a record based on a value of a data item of that record. For example, vehicle owner records may be accessed by specifying records based on vehicle owner names. Other access method may comprise "calc," which may correspond to accessing a record based on calculating a hash (or value) based on data items stored in the database 14, "direct," which may correspond to accessing a record by specifying a page number and/or record number of data stored in the database 14, "database key," which may correspond to accessing a record by specifying a physical record on a disk used to store the database 14, and/or "sequential," which may correspond to accessing one or more records stored sequentially after a record specified using an index or other access method.

Legacy network-model databases may store record data in a field that is padded so as to align that data field with a boundary, in a physical storage medium, of a data word, data page, data sector, or other data storage unit. The aligned data field may be named, but padding added to align that data field with the boundary may be an unnamed data field. At the time that many legacy network-model databases and COBOL applications were developed, data storage was often much more expensive than is the case with more modern databases and programming languages. Similarly, accessing stored data using systems from the time of many legacy network-model databases and COBOL applications was often slower and more cumbersome than is the case with more modern systems. For these and other reasons, it is common for legacy network-model databases and COBOL applications to use unnamed data regions for storage of record data.

Figure 3:
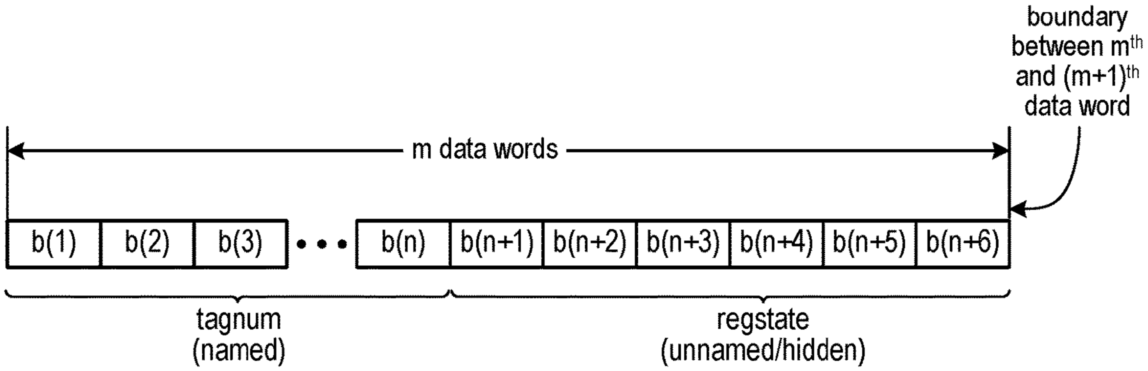
FIG. 3 is a diagram showing an example of use of unnamed data fields in a network-model database.

FIG. 3 is a diagram showing an example of use of unnamed data fields in the database 14. The example of FIG. 3 shows how a value for a tag number (tagnum) data item of a registration record and value for a state of registration (regstate) data item from that registration record may be stored in the database 14. In FIG. 3 and subsequent figures, "m," "n," and other letters may be used to represent arbitrary positive integer values. A data word may be a fixed quantity of bits.

In the example of FIG. 3, a data region comprising m sequential data words is used to store both a tag number and state of registration for a particular registration record. In the example of the database 14, a tag number may be any combination of up to 8 characters, with each character represented by a corresponding multi-bit code (e.g., an ASCII code). A state of registration may be stored as a 6-bit value between 000001 (decimal 1) and 110011 (decimal 51), with each of those values mapped to a specific state or to the District of Columbia (e.g., 00001 (decimal 1) corresponds to Alabama, 00010 (decimal 2) corresponds to Alaska, etc.). The tag number is stored as a series of sequential bits b(1) through b (n) that is too large to fit within m−1 data words, but that does fit within m−1 data words and a portion of an $m^{th}$ data word. In particular, 6 bits b (n+1) through b (n+6) remain in the $m^{th}$ data word after all bits of m−1 data words and a portion of the bits of the $m^{th}$ data are used to store the tag number. A data field consisting of the 6 bits b (n+1) through b (n+6) may be an unnamed data field that is used as a "filler" field to pad the remainder of the $m^{th}$ data word so that another data item (not shown) may begin at the boundary between the $m^{th}$ and an (m+1)th data word.

As indicated above, many legacy network-model databases stored data in unnamed data fields, which are also known as hidden data fields, and many COBOL-based legacy applications are able to recognize and access such data fields. However, and unlike languages such as C/COBOL/Assembler, JAVA and other object-oriented programming languages do not support unions or direct control memory layout. Moreover, the schema file 19 may lack information regarding memory addresses or other details of how tag numbers and states or registration are stored in the database 14. For example, the schema file 19 may simply indicate that the registration record type 44 has title number (title num), tag number (tagnum), and filler data fields.

To generate a JAVA-based API that can access unnamed data fields such as is shown in the example of FIG. 3, the API generator 10 may use redefinition data in the schema redefinition file 21. That redefinition data may indicate, for a data item that is stored in an unnamed data field (e.g., a state of registration data item), a record type for the record that includes that first data item, a second data item (e.g., a tag number data item) of that record type that is stored in a named data field adjacent to the unnamed data field, any offset (e.g., quantity of bits) between the end of the named data field and the beginning of the first data item in the unnamed data field, a length of the first data item in the unnamed data field (and/or an offset between the end of the named data field and the end of the first data item in the unnamed data field), and/or other data that may be used to access data items stored in unnamed data field. The redefinition data may further assign a name to the unnamed data field so that the field may be accessed (using the assigned name) by a JAVA-based API.

Legacy COBOL-based applications may store multiple data items using multiple data structures in a binary data block. The binary data block may be stored in a named field and be retrievable, but the meaning of data within that binary data block may only be understandable based on logic contained within the legacy COBOL-based application that created and stored that binary data block. Moreover, organization of data within a binary data block may vary based on data in other data items or other records. As a result, organization of data for different instances of the same type of data item may not be the same. For example, a sequence of data words or other data units may be used in one way to store a first instance of a data item based on some relation of that first instance to other data, but may be used in a different way to store a second instance of the data item based on some different relation of the second instance to other data.

Figure 4:
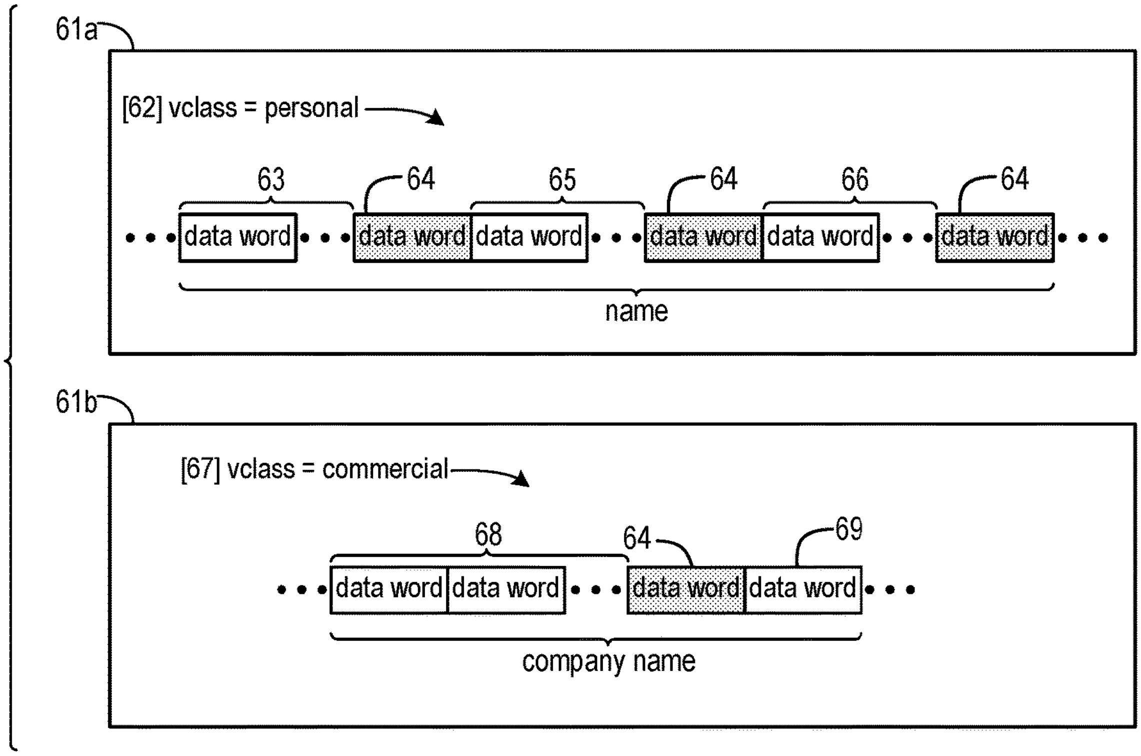
FIG. 4 is a diagram showing an example of use of binary data blocks in a network-model database.

FIG. 4 is a diagram showing an example of the above and of use of a binary data block in the database 14. In particular, FIG. 4 shows how groups of data words of a binary data block 61*a* may be used in one way to store one instance of a data item, but how groups of data words of another binary data block 61*b* may be used in a different way to store a second instance of that data item. In the example of FIG. 4, a name data item for a first vehicle owner record is stored in the binary data block 61*a* and a name data item for a second vehicle owner record is stored in the binary data block 61*b*. The name data item 62 stored in the binary data block 61*a* is for a vehicle owner record corresponding to a personal vehicle. The vehicle owner record that comprises the name data item 62 is child record of a vehicle-vehicle class-vehicle owner-vtype-related set in which a vclass data item (of the child vehicle class record in that set) has a value of "personal." For each vehicle owner record corresponding to a personal vehicle, data for a name data item is stored as a first group 63 of data words storing a last name, a delimiter data word 64 holding a predefined delimiter value, a second group 65 of data words storing a first name, another delimiter data word 64, a third group 66 of data words storing a middle name, and another delimiter data block 64. The name data item 67 stored in the binary data block 61*b* is for a vehicle owner record corresponding to a commercial vehicle. The vehicle owner record that comprises the data item 67 is child record of a vehicle-vehicle class-vehicle owner-vtype-related set in which a vclass data item (of the child vehicle class record in that set) has a value of "commercial." For each vehicle owner record corresponding to a commercial vehicle, data for a name data item is stored as a group 68 of data words storing a business name, a delimiter data word 64, and a data word 69 that holds a binary value that maps to a suffix portion of the business name (e.g., 00000001 maps to "Co.", 00000010 maps to "Inc.", etc.).

The schema file 19 may not indicate how name data items are stored for vehicle owner records or how to access name data items. Indeed, the schema file 19 may not even reflect that the vehicle owner record type includes a name data item. For example, the schema file 19 may only indicate that the vehicle owner record type includes a data block, but without indicating the data items stored in that data block.

Figure 5:
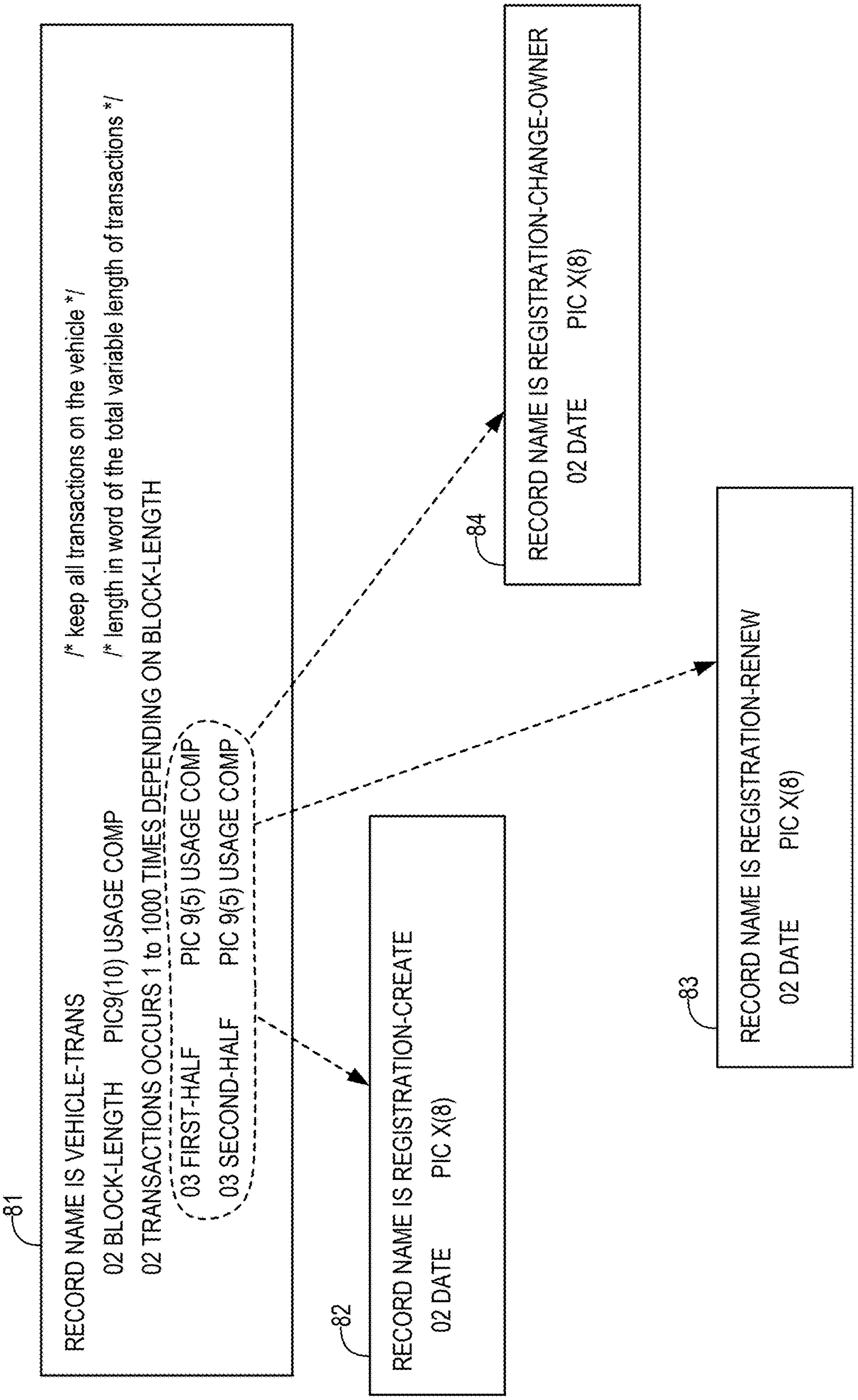
FIG. 5 is a diagram showing another example of use of binary data blocks in a network-model database.

FIG. 5 is a diagram showing another example of use of a binary data block in the database 14. FIG. 5 shows how registration-create records (corresponding to the registration-create record type 48), registration-renew records (corresponding to the registration-renew record type 49), registration-change-owner records (corresponding to the registration-change-owner record type 50), and other transaction-related records may be stored in the database 14. For example, and instead of storing transaction-related records as individual child records of a registration record (corresponding to the registration record type 44), the database may store all transaction-related child records of a registration record as a single record called a "vehicle-trans" record 81. The record 81 may comprise two fields. A first field may hold a block-length data item that indicates the size of a data item in the second field, and in particular, may be a length (e.g., in data words) of the total data used store transaction related records. In the example of FIG. 5, the first field item is at level 02, and is indicated as a picture data clause holding numbers ("PIC9") that may have up to 10 numbers ("(10)") and that is stored internally as "USAGE COMP." The second field may hold a binary data block called "transactions" (e.g., level 02) that may consist of data items that may occur 1 to 1000 times depending on the block-length value, with each of transaction field data items having a first half (level 03, PIC9 (5) USAGE COMP) and a second half (level 03, PIC9 (5) USAGE COMP).

As also shown in FIG. 5, a registration-create record 82, a registration-renew record 83, a registration-change-owner record 84, and/or other transaction-related records may be stored in the transactions binary data block. The registration-create record 82 may include a data field (level 02, picture clause holding up to 8 alphanumeric characters ("PIC X(8) ")) holding a value for a date of an initial registration, the registration-renew record 83 may include a data field holding a value for a date of a registration renewal, and the registration-change-owner record 84 may include a data field holding a value for a date of a registration update based on a change of vehicle owner. The records 82, 83, 84, and/or other records stored in the binary data block may be distinguished in any of various ways, as described below. For example, each of the records may comprise leading bytes to hold a value indicating the type of record and a length of the record.

Data indicating records stored in the binary data block of the record 81, and/or logic for interpreting the binary data block of the record 81 (e.g., logic for identifying the records 82, 83, 84, and/or other records in the binary data block of the record 81) may reside in the COBOL applications 15, but may be absent from the schema file 19. For example, the schema file 19 may simply include a vehicle-trans record type as a child record type of the transaction record type 44, may not indicate the existence of the transaction-related record types such as the record types 48, 49, and 50, may lack data on how to access transaction-related records, and may lack data on how to interpret a binary data block such as the data stored in the transactions field of the vehicle-trans record 81.

To generate a JAVA-based API that can access data stored in a binary data block, the API generator 10 may, for example, use virtual record data from the virtual record file 22 to determine how data is stored in a binary data block. That virtual record data, which may be generated based on an analysis of the COBOL applications 15 and how those applications store data in (and/or access data from) binary data blocks, may include block location data and block interpretation logic. Virtual record data in the virtual record file 22 may be configured so that record types may be searched, with block location data and/or block interpretation logic being returned/retrievable for a searched record type.

Block location data, for a record type corresponding to records stored in binary data blocks, may comprise data that indicates another record type corresponding to records that may comprise such binary data blocks. In the example of FIG. 5, block location data for a registration-create record type 48 may comprise data indicating a vehicle-trans record type, may indicate that the vehicle-trans record type is a child record type of the registration record type 44, may indicate the name ("transactions") of the data field of the vehicle-trans record type that corresponds to the binary data block, and/or may comprise other data indicating where binary data blocks holding registration-create records may be found.

Block interpretation logic may comprise data that indicate how records are stored in a binary data block, how records stored in a binary data block may be distinguished, and/or other data for identifying and/or accessing specific records in a binary data block. In the example of FIG. 5, for example, each of the records 82, 83, and 84, and other records stored in the binary data block of the record 81, may be stored sequentially (e.g., a first record, immediately followed by a second record, etc.). Each of the stored records may be of the same known record size and comprise a leading portion (e.g., one or more bytes) that indicates the record type corresponding to the record. The location logic for the registration-create record type may comprise data that indicates a registration-create record may be found by identifying a leading segment of the binary data block, examining the leading portion of that segment to determine the record type, determining the leading segment is a registration-create record if the leading portion indicates the registration-create record type 48, repeating for the next segment if the leading segment is not a registration-create record, etc. As another example, a binary data block of a record 81 may sequentially store records corresponding to all transaction-related record types, with such records stored in a predetermined order and being of the same size, and with any unneeded records having a value (e.g., date=00000000) indicating the record is not used. In that example, the location logic for the registration-create record type may comprise data that indicates, based on the known order and known record size, where in the binary data object the registration-create record is found. As yet another example, records sequentially stored in a binary data object may not be of the same size, but a leading portion of each record may comprise data that indicates the record type and data that indicates the record length. In such an example, location logic for a given record type may comprise data that indicates individual records should be sequentially examined (based on the leading portion of each record) until a record of the given record type is identified. Other types of location logic may also or alternatively be used. For example, location logic may be conditional and may depend values for one or more other data items. Those one or more other data items may be in the same record that includes the binary data block, or may be in a different record. In the example of FIG. 4, for example, location logic may depend on a value for vclass in a vehicle class record.

As indicated by the above examples, binary data blocks may be used to store entire records, or to store one or more data items of a record.

Legacy network-model databases may use data overlay to map the same data (or a field) to multiple data structures. When data overlay is used, a quantity of data, or a field of a record, may have one meaning in one context, but may have an entirely different (and/or unrelated) meaning in another context. Although many COBOL-based applications can support data overly, it is not natively supported by JAVA and other modern programming languages.

Figure 6:
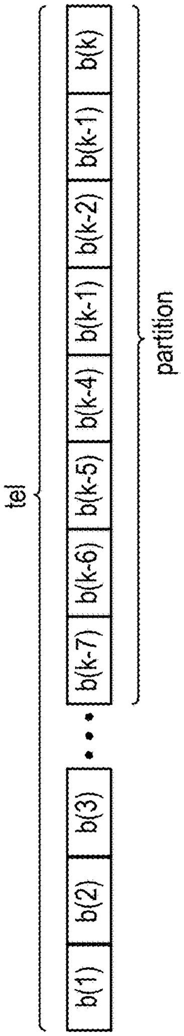
FIG. 6 is a diagram showing an example of data overlay in a network-model database.

FIG. 6 is a diagram showing an example of data overlay in the database 14. A value for a telephone number (tel) data item (e.g., of a lienholder record or of a vehicle owner record) may be stored in the database 14 as a sequence of bits b(1) through b(k). Each digit of the telephone number may be stored as a four-bit value. For example, if the last two digits of a telephone number are "7" and "3", the bits b(k-7) through b(k-4) would store the value 0111 and the bits b(k-3) through b(k) would store the value 0011. Using data overlay, the value of the subportion of the bits b(1) through b(k) data structure consisting of the bits b(k-7) through b(k) may have at least two unrelated meanings. The first meaning is a representation of the last 2 digits of a telephone number of a lienholder corresponding to a lienholder record for which the bits b(1) through b(k) are stored as the value of tel. As a second meaning, bits b(k-7) through b(k) may be used to indicate a partition of the database 14 in which the child records of that lienholder record (and child records of those child records) are stored. For example, the database 14 may store data in 10 separate storage partitions. If the bits b(k-7) through b(k) in a lienholder record correspond to any of 00, 01, 02, . . . 09, data for the child vehicle and vehicle owner records for that lienholder record, as well as data for the child vehicle class and registration records of the child vehicle record, may be stored in a first partition. If the bits b(k-7) through b(k) in a lienholder record correspond to any of 10, 11, 12, . . . 19, data for the child vehicle and vehicle owner records for that lienholder record, as well as data for the child vehicle class and registration records of the child vehicle record, may be stored in a second partition. This pattern would then continue so as to indicate storage in the third through tenth partitions.

Figure 7:
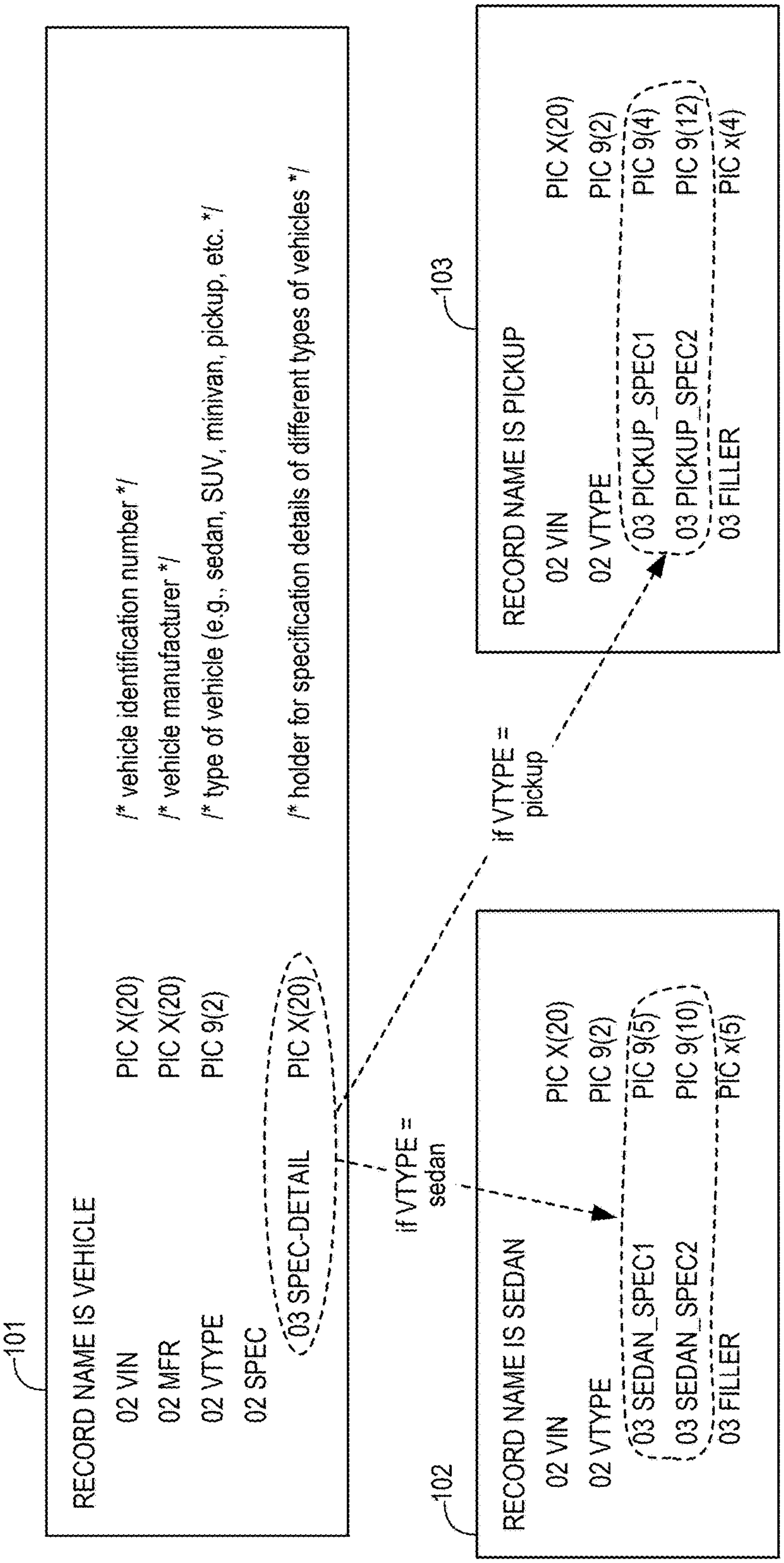
FIG. 7 is a diagram showing another example of data overlay in a network-model database.

FIG. 7 is a diagram showing another example of data overlay in the database 14. FIG. 7 shows how sedan records (corresponding to the sedan record type 46), pickup records (corresponding to the pickup record type 47), and/or other vtype-related records may be stored in the database 14. For example, and instead of storing vtype-related records as individual child records of a vehicle record (corresponding to the vehicle record type 41), the database 14 may store vtype-related child records as parts of parent vehicle records such as a vehicle record 101. The vin and vtype data values for a vtype-related child record (e.g., the sedan record 102 or the pickup record 103) are the same as the vin and vtype data values of the parent vehicle record (e.g., the record 101). The remaining data of a vtype-related child record is stored in a spec-detail field of the parent vehicle record. However, interpretation of the data item in that spec-detail field will vary based on the value for vtype.

For example, if the value of vtype indicates sedan, the data item in the spec-detail field of the vehicle record 101 may be interpreted as shown in the sedan record 102. In particular, the first 5 alphanumeric characters in the spec-detail field will be interpreted as a value for sedan_spec1, the next 10 characters in the spec-detail field will be interpreted as a value for sedan_spec2, and the remaining 5 characters in the spec-detail field will be interpreted as filler (and potentially used as an unnamed data field such as is described in connection with FIG. 3). If the value of vtype indicates pickup, the spec-detail field of the vehicle record 101 may be interpreted as shown in the pickup record 102. In particular, the first 4 alphanumeric characters in the spec-detail field will be interpreted as a value for pickup_spec1, the next 12 characters in the spec-detail field will be interpreted as a value for pickup_spec2, and the remaining 4 characters in the spec-detail field will be interpreted as filler (and potentially used as an unnamed data field such as is described in connection with FIG. 3). If the value of vtype indicates another vehicle type (e.g., SUV, minivan, motorcycle), the data in spec-detail field of the vehicle record 101 may be interpreted in other ways specific to each vehicle type.

Data indicating records that may stored using data overlay, and/or data indicating how overlay data (e.g., the data in the spec-detail field in the example of FIG. 7) should be interpreted, may reside in the COBOL applications 15, but may be absent from the schema file 19. For example, the schema file 19 may include a vehicle record type corresponding to the vehicle record 101 (e.g., indicating that vehicle records have fields for vin, mfr, vtype, and spec-detail), may not indicate the existence of vtype-related record types such as the sedan record type 46 and the pickup record type 47, may lack data on how to access vtype-related records, and may lack data on how to interpret overlay data such as data stored in the spec-detail field of the vehicle record 101.

To generate a JAVA-based API that can access data stored using data overlay, the API generator 10 may, for example, use additional virtual record data from the virtual record field 22 to determine how data is stored using data overlay. That additional virtual record data, which may be generated based on an analysis of the COBOL applications 15 and how those applications store data and/or access data using data overly, may include overlay mapping data. The additional virtual record data in the virtual record file 22 may be configured so that record types may be searched, with overlay mapping data being returned/retrievable for a searched record type.

Overlay mapping data, for a record type corresponding to records stored using data overlay, may comprise data that indicate where data for fields of that record type may be found. This may, for example, comprise a mapping of each field of the record type to a field (or to a specific portion of a field) of another record type. In the example of FIG. 7, overlay mapping data for the sedan record type 46 may map the vin field of the sedan record 102 to the vin field of the vehicle record 101, map the vtype field of the sedan record 102 to the vtype field of the vehicle record 101, map the sedan_spec1 field of the sedan record 102 to the first five characters of the spec-detail field of the vehicle record 101, and map the sedan_spec2 field of the sedan record 102 to the $6^{th}$ through $15^{th}$ characters of the spec-detail field of the vehicle record 101. Overlay mapping data for the pickup record type 47 may map the vin field of the pickup record 103 to the vin field of the vehicle record 101, map the vtype field of the pickup record 103 to the vtype field of the vehicle record 101, map the pickup_spec1 field of the pickup record 103 to the first four characters of the spec-detail field of the vehicle record 101, and map the pickup_spec2 field of the pickup record 103 to the 5th through $16^{th}$ characters of the spec-detail field of the vehicle record 101.

Figure 8:
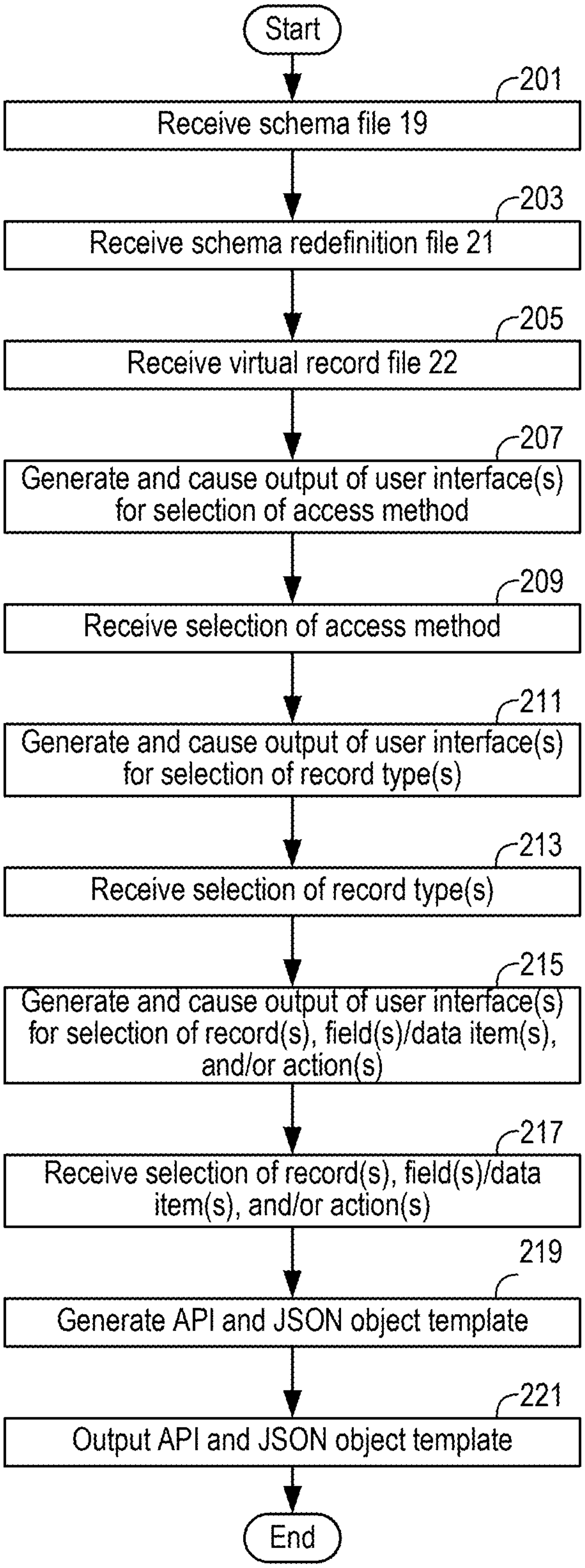
FIG. 8 is a flow chart showing an example method performed by an API generator.

FIG. 8 is a flow chart showing an example method for operation of the API generator 10. For convenience, the description of the method of FIGS. 8 and 9 will refer to steps being performed by the API generator 10. Because the API generator 10 comprises one or more computer applications, however, it is to be appreciated that the steps of FIGS. 8 and 9 may be performed by a server or other computing device executing those one or more applications. That computing device may perform the steps of FIGS. 8 and 9 based on stored instructions comprised by the one or more applications of the API generator 10. For example, a memory of that computing device, and/or one or more other non-transitory machine-readable storage media (e.g., any of the types of memory described in connection with FIG. 10), may store instructions that, when executed by one or more processors of that computing device, cause that computing device to perform the steps of FIGS. 8 and 9. The steps of FIGS. 8 and 9 may be performed in other orders and/or may otherwise be modified. One or more of the steps of FIGS. 8 and 9 may be omitted, and/or other steps may be added. Also, or alternatively, the steps of FIGS. 8 and 9 and/or portions of one or more of those steps may be allocated among, and performed by, different computing devices.

In step 201, the API manager 10 may receive the schema file 19. Step 201 may comprise receiving the schema file 19 and storing the schema file 19 (e.g., in a local memory of the computing device executing the API manager 10), and/or receiving and storing (in the local memory) one or URIs or other pointers to the schema file 19.

In step 203, the API manager 10 may receive the schema redefinition file 21. Step 203 may comprising receiving the schema redefinition file 21 and storing the schema redefinition file 21 (e.g., in the local memory), and/or receiving and storing (in the local memory) one or URIs or other pointers to the schema redefinition file 21. Also, or alternatively, step 203 may comprise generating some or all of the schema redefinition file 21. The schema redefinition file 21 may be generated by, e.g., parsing the commands of one or more of the COBOL application(s) 15 configured to access the database 14.

In step 205, the API manager 10 may receive the virtual record file 22. Step 205 may comprising receiving the virtual record file 22 and storing the virtual record file 22 (e.g., in the local memory), and/or receiving and storing (in the local memory) one or URIs or other pointers to the virtual record file 22. Also, or alternatively, step 203 may comprise generating some or all of the virtual record file 22. The virtual record file 22 may be generated by, e.g., parsing the commands of one or more of the COBOL application(s) 15 configured to access the database 14.

In step 207, the API manager 10 may generate one or more user interfaces for receiving input from the user 12 to select one or more access methods for selecting record types of the database 14, and may cause output of those one or more interfaces via the computing device 13 associated with the user 12. The selectable access methods may comprise "index," "calc," "direct," "database key," and/or "sequential." In step 209, the API manager 10 may receive input from user 12 (via the computing device 13) selecting an access method.

In step 211, the API manager 10 may generate, based on the schema file 19, the redefinition file 21, and/or the virtual record file 22, one or more user interfaces for receiving input from the user 12 to select one or more record types accessible using the access method selected in step 209. For example, the redefinition file 21 and/or the virtual record file 22 may be used to determine records and/or access methods not described by the schema file 19 so that such records may be included in the one or more user interfaces of step 211. As part of step 211, the API manager 10 may cause output via the computing device 13 of those one or more generated interfaces for selection of one or more record types. In step 213, the API manager 10 may receive input from user 12 (via the computing device 13) selecting one or more record types from the user interface of step 211. Steps 211 and 213 may be performed in multiple iterations. For example, after receiving user input selecting a record type, the API manager 10 may repeat step 211 to generate and cause output of a user interface for selection of other record types in the same set type as the already-selected record type, and may repeat step 213 to receive user input selecting one or more additional record types.

In step 215, the API manager 10 generate, based on the selection(s) of record type(s) in one or more iterations of step 213, a user interface to receive a user selection of one or more records corresponding to the selected record types (and/or selection of one or more specific fields of such records) and/or one or more actions to be performed in connection with records of the selected record types. As part of step 215, the API manager 10 may cause output via the computing device 13 of those one or more generated interfaces for selection of one or more records (or fields) and/or selection of one or more actions. The user interface of step 215 may provide options to select one or more records, of a selected record type, to be accessed; options to select one or data items, of one or more selected records, to be accessed; options to select one or more actions to be performed in connection with selected record(s) and/or data item(s) (e.g., read data from a record/data item, write data to a record/data item); options to add one or more records; options to delete one or more records; and/or other options to select actions to be performed in connection with records of the selected record type(s). In step 217, the API manager 10 may receive input from the user 12 (via the computing device 13) selecting one records, data items, and/or actions from the user interface of step 215. Steps 215 and 217 may also be performed in multiple iterations.

In step 219, based on the user selections in steps 213 and step 217, and based on the schema data from the schema file 19, the redefinition data from the schema redefinition file 21, and the virtual record data from the virtual record file 22, the API generator 10 may generate an API and a JSON template. Additional details of step 219 are described below in connection with FIG. 9. In step 221, the API manager 10 may output, to the computing device 13 and/or to another computing device, the API and JSON template generated in step 219.

The generated API may comprise JAVA code that may be execute to access data that may be stored in the database 14 using unnamed data fields, using binary data blocks, and/or using data overly. For example, to access data stored in the database 14 using unnamed data fields, the generated API may comprise JAVA code that renames a filler/unnamed data field in which that data is stored, and that then accesses that renamed data field. To access data stored in the database 14 using binary data blocks, the generated API may comprise JAVA code that accesses the record storing the binary data block. That JAVA code may access particular data within that binary data block using block location logic corresponding to that particular data. To access data stored in the database 14 using data overly, the generated API may comprise JAVA code that accesses records mapped to a record for which data is stored using data overlay.

Figure 9:
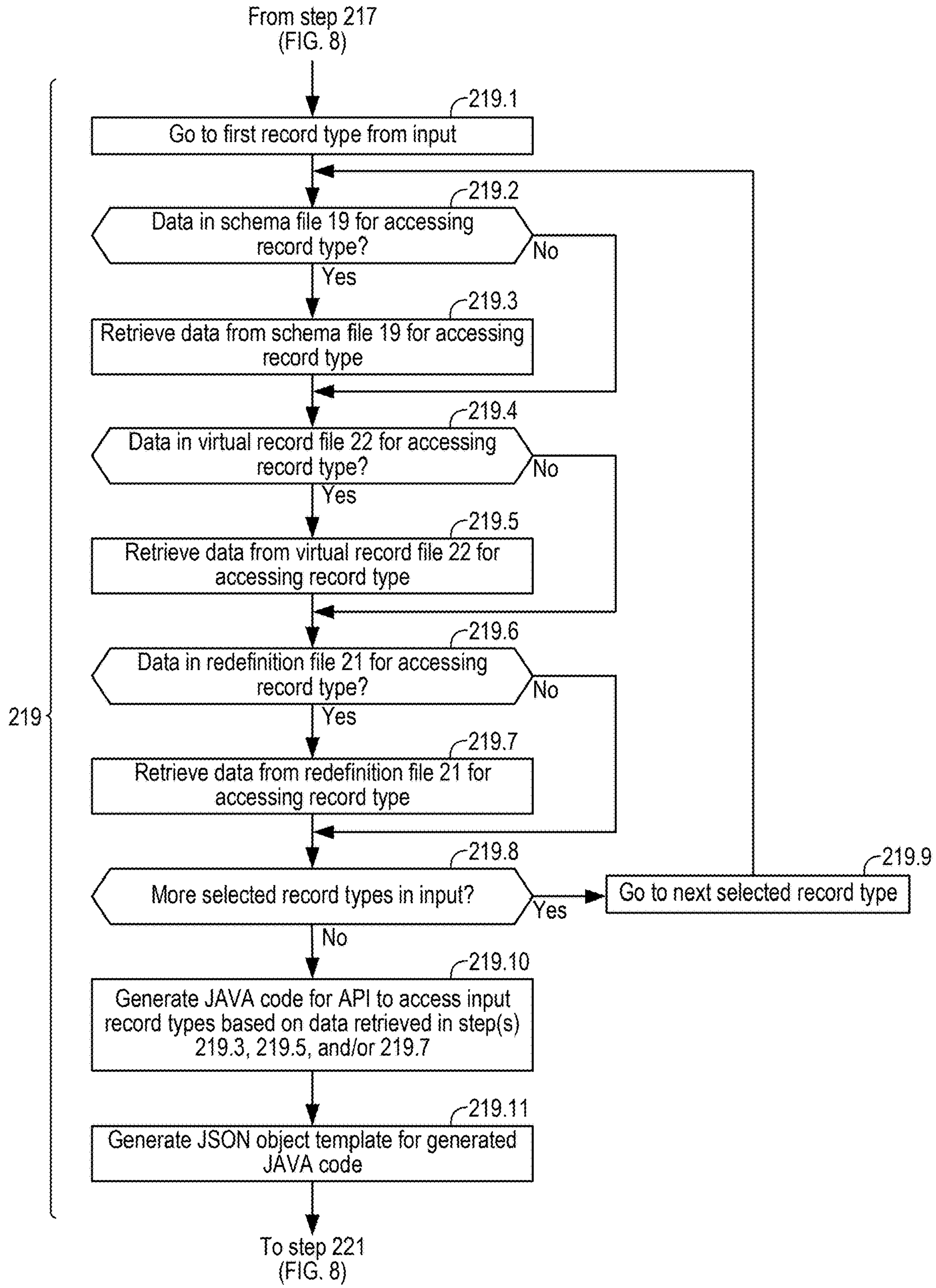
FIG. 9 is a flow chart showing additional steps comprised by the method of FIG. 8.

FIG. 9 is a flow chart showing additional steps comprised by step 219 of FIG. 8. As indicated above, in step 213 a user may have provided input selecting one or more record types. In step 219.1, the API manager 10 may go to (e.g., choose for further processing) a first record type of the selected one or more record types. In step 219.2, the API manager may then determine if the schema file 19 includes data for accessing records corresponding to the first record type. If yes, the API manager 10 may in step 219.3 retrieve data from the schema file 19 for accessing records corresponding to the first record type.

After performing step 219.3, or after a "no" determination in step 219.2, the API manager 10 may perform step 219.4. In step 219.4, the API manager 10 may determine if the virtual record file 22 includes data for accessing records corresponding to the first record type (or portions of such records). Such data may, for example comprise block location data, block interpretation data, and/or overlay mapping data. If the virtual record file 22 includes data for accessing the records corresponding to first record type (or portions of such records), the API manager 10 may in step 219.5 retrieve that data from the virtual record file 22.

After performing step 219.5, or after a "no" determination in step 219.4, the API manager may perform step 219.6. In step 219.6, the API manager 10 may determine if the redefinition file 21 includes data for accessing records corresponding to the first record type (or portions of such records). Such data may, for example, comprise redefinition data for accessing unnamed data fields. If the redefinition file 21 includes data for accessing the records corresponding to first record type (or portions of such records), the API manager 10 may in step 219.7 retrieve that data from the redefinition file 21.

After performing step 219.7, or after a "no" determination in step 219.6, the API manager 10 may perform step 219.8. In step 219.8, the API manager 10 may determine if there are additional record types, selected in step 213, for which access information has not been obtained. If yes, the API manager 10 may perform step 219.9 and go to (e.g., choose for further processing) a next selected record type, and may repeat the processing that begins at step 219.2 for that next selected record type. If no, the API manager 10 may perform step 219.10.

In step 219.10, the API manager 10 may generate, based on the data retrieved in steps 219.3, 219.5, and/or 219.7, JAVA code to access records corresponding to the record types selected in step 213. The records to be accessed may based on selections made in step 217 (e.g., specific records of the type(s) selected in step 213). The type(s) of access (e.g., read to a record, delete a record, write to a record, update a record, add a record) provided by the generated JAVA code may be based on action(s) selected in step 217.

In step 219.11, the API manager 10 may generate, based on the action(s) and/or record(s) selected in step 217, a JSON object template for a JSON object that may be used to for provide input to, and/or receive output from, the JAVA code generated in in step 219.10. Inputs may, for example, comprise indications of records (or specific record fields) to be accessed, data to be written to records, records to be added, etc. Outputs may, for example, comprise data read from records, indications of records (or specific record fields) accessed, etc.

Although the above examples describe the API manager 10 generating a JAVA-based API and JSON object template, an API manager similar to the API manager 10 may also or alternatively be configured to generate an API based on one or more other non-COBOL programming languages and/or to generate a template in another format.

Figure 10:
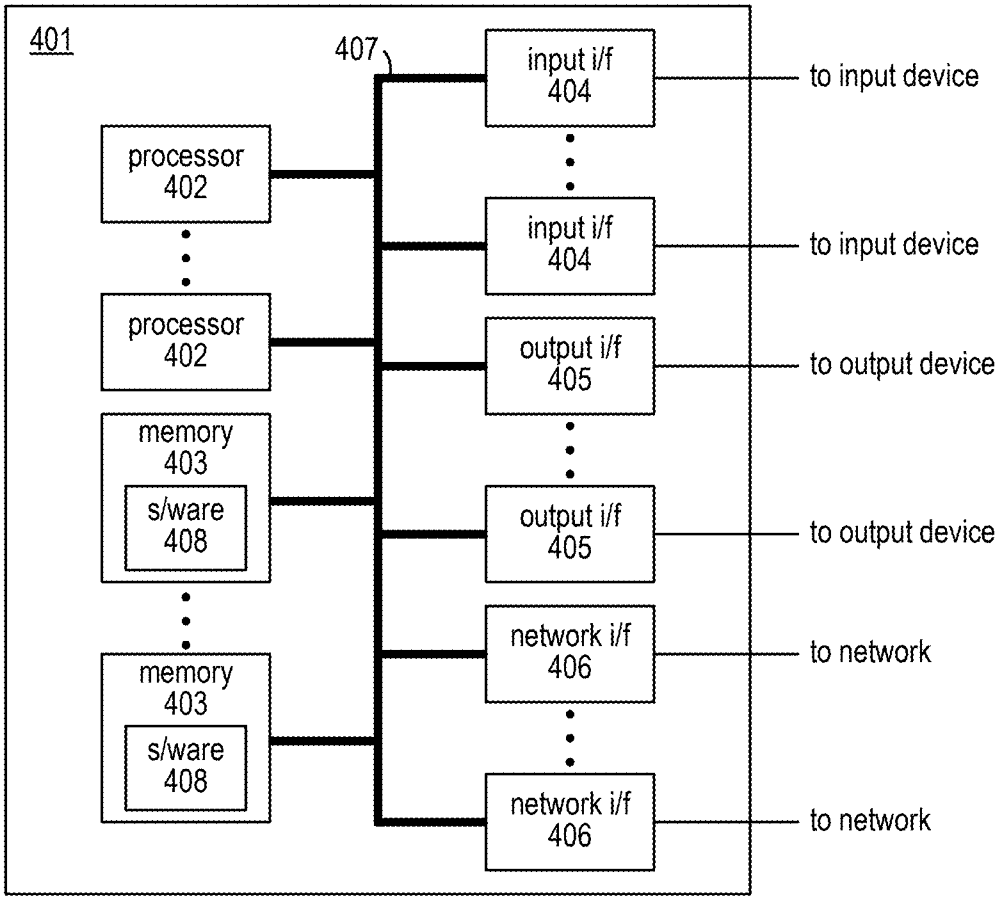
FIG. 10 is a block diagram of an example computing device.

FIG. 10 is a block diagram of an example computing device 401, one or more of which may be used to implement the computing device 13, a server or other computing device performing operations of the API generator 10, a computing device performing operations of any of the applications 26, a computing device performing operations of the gateway 26, and/or other computing device(s) performing operations such as those described herein. Computing device 401 may comprise one or more processors 402, one or more memories 403, one or more input interface controllers 404, one or more output interface controllers 405, and one or more network interfaces 406, all of which may communicate over one or more busses 407. Processor(s) 402 may include any of various types of computational devices such as, without limitation, programmable microprocessors. Processor(s) 402 may execute instructions that cause computing device 401 to perform one or more operations such as are described herein. Memory(ies) 403 may include any of various types of non-transitory machine-readable storage media such as, without limitation, random access memory (RAM), read-only memory (ROM), FLASH memory, magnetic tape or discs, optical discs, etc. Memory(ies) 403 may be volatile or non-volatile. Input interface controller(s) 404 may include hardware and/or software that allow user input devices (e.g., a keyboard, a mouse, a touch screen) to communicate data to processor(s) 402. Output interface controller(s) 405 may include hardware and/or software that allow user output devices (e.g., display screens, printers) to output user-understandable information based on data from processor(s) 402. Network interface(s) 406 may include hardware and/or software that allow processor(s) 402 to communicate with processors of other computers via one or more types of wired or wireless networks. Examples of network interfaces include, without limitation, Ethernet adaptors and Wi-Fi adaptors (e.g., operating in accordance with one or more IEEE 802.11 WLAN standards).

Memory(ies) 403 may store software 408 that provides instructions to processor(s) 402 that, when executed by processor(s) 402, cause computing device 401 to perform some or all operations such as are described herein. Software 408 may comprise machine-executable instructions and/or other data, and may include both application software and operating system software. Executable instructions that cause computing device 401 to perform operations such as are described herein may also or alternatively be stored in other forms, e.g., as firmware or as hardware logic in an integrated circuit.

The foregoing has been presented for purposes of example. The foregoing is not intended to be exhaustive or to limit features to the precise form disclosed. The examples discussed herein were chosen and described in order to explain principles and the nature of various examples and their practical application to enable one skilled in the art to use these and other implementations with various modifications as are suited to the particular use contemplated. The scope of this disclosure encompasses, but is not limited to, any and all combinations, sub-combinations, and permutations of structure, operations, and/or other features described herein and in the accompanying drawing figures.

The invention claimed is:

1. A method comprising:

receiving, by an application programming interface (API) generator executing on a computing device, and for a network-model database configured for access via one or more Common Business Oriented Language (COBOL) applications, one or more configuration files comprising:

schema data indicating, for the network-model database, record types and relationships between those record types, schema redefinition data indicating record types, of the network-model database, associated with data items stored in hidden data fields of the network-model database, and virtual record data, for accessing data items stored in binary data blocks of the network-model database, that comprises block location data and block interpretation data;

receiving, by the API generator, selection of one or more record types of the network-model database;

receiving, by the API generator, selection of one or more actions to be performed for one or more records, of the selected one or more record types, stored in the network-model database;

generating, based on the selected one or more record types, based on the selected one or more actions, and based on the one or more configuration files, a JAVA-based API for performing the one or more actions; and outputting, by the API generator, the generated JAVA-based API.

2. The method of claim 1, wherein the virtual record data further comprises data overlay mapping data indicating data items stored in the network-model database using data overlay.

3. The method of claim 2, wherein the data overlay mapping data indicates, for a data item of the data items stored in the network-model database using data overlay, a first meaning assigned to the data item and a second meaning, unrelated to the first meaning, assigned to a subportion of the data item.

4. The method of claim 1, wherein the generating comprises generating one or more JAVA Script Object Notation (JSON) object templates for JSON objects to provide input to the generated API.

5. The method of claim 1, wherein the one or more actions comprise one or more of:

reading data from a record of the one or more records,
writing data to a record of the one or more records,
deleting a record of the one or more records, or
creating a record of the one or more record types.

6. A computing device comprising:

one or more processors; and memory storying instructions that, when executed by the one or more processors, cause the computing device to:

receive, by an application programming interface (API) generator executing on the computing device, and for a network-model database configured for access via one or more Common Business Oriented Language (COBOL) applications, one or more configuration files comprising:

schema data indicating, for the network-model database, record types and relationships between those record types, schema redefinition data indicating record types, of the network-model database, associated with data items stored in hidden data fields of the network-model database, and virtual record data, for accessing data items stored in binary data blocks of the network-model database, that comprises block location data and block interpretation data;

receive, by the API generator, selection of one or more record types of the network-model database;

receive, by the API generator, selection of one or more actions to be performed for one or more records, of the selected one or more record types, stored in the network-model database;

generate, based on the selected one or more record types, based on the selected one or more actions, and based on the one or more configuration files, a JAVA-based API for performing the one or more actions; and output, by the API generator, the generated JAVA-based API.

7. The computing device of claim 6, wherein the virtual record data further comprises data overlay mapping data indicating data items stored in the network-model database using data overlay.

8. The computing device of claim 7, wherein the data overlay mapping data indicates, for a data item of the data items stored in the network-model database using data overlay, a first meaning assigned to the data item and a second meaning, unrelated to the first meaning, assigned to a subportion of the data item.

9. The computing device of claim 6, wherein the instructions, when executed by the one or more processors, cause the computing device to generate the JAVA-based API by also generating one or more JAVA Script Object Notation (JSON) object templates for JSON objects to provide input to the generated API.

10. The computing device of claim 6, wherein the one or more actions comprise one or more of:

reading data from a record of the one or more records,
writing data to a record of the one or more records,
deleting a record of the one or more records, or
creating a record of the one or more record types.

11. One or more non-transitory machine-readable media storing instructions that, when executed by one or more processors of a computing device, cause the computing device to:

receive, by an application programming interface (API) generator executing on the computing device, and for a network-model database configured for access via one or more Common Business Oriented Language (COBOL) applications, one or more configuration files comprising:

schema data indicating, for the network-model database, record types and relationships between those record types, schema redefinition data indicating record types, of the network-model database, associated with data items stored in hidden data fields of the network-model database, and virtual record data, for accessing data items stored in binary data blocks of the network-model database, that comprises block location data and block interpretation data;

receive, by the API generator, selection of one or more record types of the network-model database;

receive, by the API generator, selection of one or more actions to be performed for one or more records, of the selected one or more record types, stored in the network-model database;

generate, based on the selected one or more record types, based on the selected one or more actions, and based on the one or more configuration files, a JAVA-based API for performing the one or more actions; and output, by the API generator, the generated JAVA-based API.

12. The one or more non-transitory machine-readable media of claim 11, wherein the virtual record data further comprises data overlay mapping data indicating data items stored in the network-model database using data overlay.

13. The one or more non-transitory machine-readable media of claim 11, wherein the instructions, when executed by the one or more processors of the computing device, cause the computing device to generate the JAVA-based API by also generating one or more JAVA Script Object Notation (JSON) object templates for JSON objects to provide input to the generated API.

14. The one or more non-transitory machine-readable media of claim 11, wherein the one or more actions comprise one or more of:

reading data from a record of the one or more records,
writing data to a record of the one or more records,
deleting a record of the one or more records, or
creating a record of the one or more record types.

15. The method of claim 1, wherein the block location data indicates, for a record type corresponding to records stored in the binary data blocks of the network-model database, another record type corresponding to records comprising the binary data blocks, and wherein the block interpretation data indicates one or more of:

how records are stored in the binary data blocks, or
how to distinguish records stored in a binary data block.

16. The method of claim 1, wherein the receiving the selection of the one or more record types comprises receiving the selection, of the one or more record types, via a user interface generated based on the schema data and based on one or more of the schema redefinition data or the virtual record data.

17. The method of claim 1, wherein the receiving the one or more configuration files comprises receiving pointers to the schema data, the schema redefinition data, and the virtual record data.

18. The computing device of claim 6, wherein the block location data indicates, for a record type corresponding to records stored in the binary data blocks of the network-model database, another record type corresponding to records comprising the binary data blocks, and wherein the block interpretation data indicates one or more of:

how records are stored in the binary data blocks, or
how to distinguish records stored in a binary data block.

19. The computing device of claim 6, wherein the instructions, when executed by the one or more processors, cause the computing device to receive the selection of the one or more record types by receiving the selection, of the one or more record types, via a user interface generated based on the schema data and based on one or more of the schema redefinition data or the virtual record data.

20. The computing device of claim 6, wherein the instructions, when executed by the one or more processors, cause the computing device to receive the one or more configuration files by receiving pointers to the schema data, the schema redefinition data, and the virtual record data.

21. The one or more non-transitory machine-readable media of claim 11, wherein the block location data indicates, for a record type corresponding to records stored in the binary data blocks of the network-model database, another record type corresponding to records comprising the binary data blocks, and wherein the block interpretation data indicates one or more of:

how records are stored in the binary data blocks, or how to distinguish records stored in a binary data block.

22. The one or more non-transitory machine-readable media of claim 11, wherein the instructions, when executed by the one or more processors of the computing device, cause the computing device to receive the selection of the one or more record types by receiving the selection, of the one or more record types, via a user interface generated based on the schema data and based on one or more of the schema redefinition data or the virtual record data.

23. The one or more non-transitory machine-readable media of claim 11, wherein the instructions, when executed by the one or more processors of the computing device, cause the computing device to receive the one or more configuration files by receiving pointers to the schema data, the schema redefinition data, and the virtual record data.

* * * * *